(12) United States Patent
Ebrahimi Afrouzi (10) Patent No.: US 11,886,194 B1
(45) Date of Patent: Jan. 30, 2024

(54) ROBOTIC SURFACE CLEANING SERVICE

(71) Applicant: Ali Ebrahimi Afrouzi, Henderson, NV (US)

(72) Inventor: Ali Ebrahimi Afrouzi, Henderson, NV (US)

(73) Assignee: AI Incorporated, Toronto (CA)

(*) Notice: Subject to any disclaimer, the term of this patent is extended or adjusted under 35 U.S.C. 154(b) by 121 days.

(21) Appl. No.: 17/510,977

(22) Filed: Oct. 26, 2021

Related U.S. Application Data (63) Continuation of application No. 16/249,011, filed on Jan. 16, 2019, now abandoned.

(60) Provisional application No. 62/621,179, filed on Jan. 24, 2018.

(51) Int. Cl.
| | | |
|---|---|---|
| *G05D 1/02* | (2020.01) | |
| *A47L 9/00* | (2006.01) | |
| *A47L 11/40* | (2006.01) | |
| *G05D 1/00* | (2006.01) | |
| *A47L 9/28* | (2006.01) | |
| *G06Q 50/10* | (2012.01) | |

(52) U.S. Cl.
CPC ............ *G05D 1/0219* (2013.01); *A47L 9/009* (2013.01); *A47L 9/2857* (2013.01); *A47L 11/4011* (2013.01); *G05D 1/0022* (2013.01); *G05D 1/0088* (2013.01); *G05D 1/0225* (2013.01); *A47L 2201/04* (2013.01); *G05D 2201/0203* (2013.01); *G06Q 50/10* (2013.01)

(58) Field of Classification Search
None
See application file for complete search history.

(56) References Cited

U.S. PATENT DOCUMENTS

| | | | |
|---|---|---|---|
| 4,307,484 A | 12/1981 | Williams | |
| 6,010,239 A | 1/2000 | Hardgrave | |
| 6,611,120 B2* | 8/2003 | Song ................ | G05D 1/0038 318/587 |
| 6,917,853 B2 | 8/2005 | Chirnomas | |
| 9,189,812 B2 | 11/2015 | Kropp | |
| 10,038,743 B2* | 7/2018 | Gu ..................... | H04L 67/12 |
| 10,304,055 B2* | 5/2019 | Moore .............. | G07F 15/12 |
| 2002/0116208 A1 | 8/2002 | Chirnomas | |
| 2006/0293788 A1* | 12/2006 | Pogodin ........... | G05D 1/0011 701/23 |
| 2009/0199871 A1 | 8/2009 | Rushin | |
| 2012/0130535 A1 | 5/2012 | Kropp | |

(Continued)

FOREIGN PATENT DOCUMENTS

| | | |
|---|---|---|
| CN | 107230012 A | 10/2017 |
| CN | 108805301 A | 6/2018 |
| JP | 2001149294 A | 11/1999 |

*Primary Examiner* — Todd Melton (57) ABSTRACT

Included is a surface cleaning service system including: one or more robotic surface cleaning devices, each including: a chassis; a set of wheels; one or more motors to drive the wheels; one or more processors; one or more sensors; and a network interface card, wherein the one or more processors of each of the one or more robotic surface cleaning devices determine respective usage data. A control system or the one or more processors of each of the one or more robotic surface cleaning devices is configured to associate each usage data with a particular corresponding robotic surface cleaning device of the one or more robotic surface cleaning devices.

18 Claims, 2 Drawing Sheets

(56) References Cited

U.S. PATENT DOCUMENTS

2017/0161649 A1   6/2017   Charles
2018/0018650 A1   1/2018   Gottstein

* cited by examiner

ROBOTIC SURFACE CLEANING SERVICE

CROSS-REFERENCE TO RELATED APPLICATIONS

This application is a Continuation of U.S. Non-Provisional patent application Ser. No. 16/249,011, filed Jan. 16, 2019, which claims the benefit of U.S. Provisional Patent Application No. 62/621,179, filed Jan. 24, 2018, each of which is hereby incorporated by reference.

In this patent, certain U.S. patents, U.S. patent applications, or other materials (e.g., articles) have been incorporated by reference. Specifically, U.S. patent application Ser. Nos. 15/272,752, 15/949,708, 16/048,179, 16/048,185, 16/163,541, 16/163,562, 16/163,508, 16/185,000, 62/681,965, 62/614,449, 16/109,617, 16/051,328, 15/449,660, 16/041,286, 15/406,890, 14/673,633, 16/163,530, 62/746,688, 62/740,573, 62/740,580, 15/955,480, 15/425,130, 15/955,344, 15/048,827, 14/817,952, 16/198,393, 15/981,643, 15/986,670, 62/664,389, 15/447,450, 15/447,623, 62/665,942, 62/617,589, 62/620,352, 15/951,096, 16/130,880, 14/948,620, 16/239,410, and 16/230,805, are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

This invention relates to robotic devices. More specifically, this disclosure related to a robotic surface cleaning service.

BACKGROUND

Various surface cleaning devices exist to solve the problem of maintaining clean and dust-free floors in residential, commercial, and industrial settings. In most cases, users purchase surface cleaning devices and are responsible for maintaining clean and dust-free floors using the devices themselves. This practice creates a high initial cost to the user and a relatively low cost of maintenance after the initial purchase. As surface cleaning devices become more and more complex, the initial cost of a surface cleaning device may be prohibitively high for some users. Furthermore, maintaining clean and dust-free floors using user-operated surface cleaning devices can be time-consuming and daunting for the user.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some aspects include a surface cleaning service system, including one or more robotic surface cleaning devices, each including: a chassis; a set of wheels; one or more motors to drive the wheels; one or more processors; one or more sensors; a network interface card; and a memory storing instructions that when executed by the one or more processors effectuates operations, including: determining, with the one or more processors, usage data of a respective robotic surface cleaning device.

DETAILED DESCRIPTION OF SOME EMBODIMENTS

The present techniques will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present techniques may be practiced without some or all of these specific details. In other instances, well known process steps and/or structures have not been described in detail in order to not unnecessarily obscure the present inventions. Further, it should be emphasized that several inventive techniques are described, and embodiments are not limited to systems implementing all of those techniques, as various cost and engineering tradeoffs may warrant systems that only afford a subset of the benefits described herein or that will be apparent to one of ordinary skill in the art.

Some embodiments include a surface cleaning service system including: one or more robotic surface cleaning devices, each including: a chassis; a set of wheels; one or more motors to drive the wheels; one or more processors; one or more sensors; a usage monitoring mechanism; and a network interface card (NIC); and a server, wherein the one or more processors of each of the one or more robotic surface cleaning devices is configured to transmit usage data recorded by their respective usage monitoring mechanism to the server, and wherein the server is configured to associate each usage data received with a particular robotic surface cleaning device of the one or more robotic surface cleaning devices and to a user account, and generate a cleaning service statement for the user account based on the usage data associated with the user account.

In some embodiments, the usage monitoring mechanism of a robotic surface cleaning device measures an amount usage of the robotic surface cleaning device while in the possession of a particular user. In some embodiments, the amount of usage of a robotic surface cleaning device is measured by a sensor monitoring the run time of the robotic surface cleaning device. In some embodiments, the amount of usage of a robotic surface cleaning device is measured by a sensor monitoring the weight of a debris container provided within the robotic surface cleaning device. In some embodiments, the amount of usage of a robotic surface cleaning device is measured by a sensor monitoring the volume of debris within a debris container of the robotic surface cleaning device. In some embodiments, the amount of usage of a robotic surface cleaning device is measured by a sensor monitoring the number of times a debris container of the robotic surface cleaning device is removed and emptied. In some embodiments, the described monitoring methods or other types of methods are used separately or in combination to estimate overall usage of a robotic surface cleaning device while in the possession of the particular user.

In some embodiments, the NIC of each of the one or more robotic surface cleaning devices includes a unique Media Access Control address (MAC address). The MAC address of a NIC uniquely identifies each of the one or more robotic devices. In some embodiments, each NIC is assigned an Internet Protocol address (IP address) from a wireless router, which connects each of the one or more robotic surface cleaning devices to the internet. In some embodiments, the one or more processors of the one or more robotic surface cleaning devices sends usage data over the internet to the server at periodic intervals. In some embodiments, the server identifies each of the one or more robotic devices using their MAC address. In some embodiments, the server or an operator of the service identifies the current user accounts associated with each of the one or more robotic surface cleaning devices from which usage data is received and adds the respective usage data from each of the one or more robotic devices to a running total of each of the corresponding current user accounts. In some embodiments, the server or the operator of the service generates periodic cleaning service statements based on the amount of usage and a predetermined rate. In some embodiments, the one or more users receive a periodic surface cleaning service statement and pay the service provider the amount billed on the statement.

In some embodiments, the processor of the one or more robotic surface cleaning devices provides other information to the server. Information can include, but is not limited to, an instruction, a location, a navigation route to the location, a type of cleaning, robotic surface cleaning device settings, usage data, sensors data, environmental data, a cleaning movement path, mapping information, localization information, scheduling information, a status, a task progress, upcoming tasks, completed tasks, incomplete tasks, warning messages, a battery level, a debris container volume, a debris container weight, a run time, number of times a debris container is emptied, a robotic surface cleaning device condition, a parking area location, a charging station location, a debris collection location, a service location, robotic surface cleaning device wheel speed, robotic surface cleaning device impeller speed, robotic surface cleaning device brush speed, traffic data, a floor type, obstacle data, error notifications, number of collisions, and other types of information.

In some embodiments, one of the one or more users requests two or more robotic surface cleaning devices. In some embodiments, the two of more robotic surface cleaning devices collaborate to clean surfaces more efficiently using collaborative methods for robotic devices, such as those described in U.S. patent application Ser. Nos. 15/981,643, 15/986,670, 16/185,000, 15/048,827 and 14/948,620, the entire contents of which are hereby incorporated by reference.

In some embodiments, the processors of the one or more robotic surface cleaning devices communicate and collaborate with one another to manage the surface cleaning service autonomously using collaborative methods for robotic devices, such as those described in U.S. patent application Ser. Nos. 15/981,643, 15/986,670, 16/185,000, 15/048,827 and 14/948,620, the entire contents of which are hereby incorporated by reference. In some embodiments, the processors of the one or more robotic surface cleaning devices receive a request for surface cleaning services at a particular location. In some embodiments, the processors of the one or more robotic surface cleaning devices share intelligence and collaborate to determine which robotic surface cleaning robotic device of the one or more robotic surface cleaning devices should respond to the surface cleaning request. In some embodiments, the processors of the one or more robotic surface cleaning devices share intelligence and determine which robotic surface cleaning robotic device of the one or more robotic surface cleaning devices should respond to the surface cleaning request based on the intelligence shared between the one or more robotic surface cleaning devices, including location of robotic surface cleaning devices (e.g., to determine nearest robotic surface cleaning device), fill volume of debris containers of robotic surface cleaning devices, battery charge of robotic surface cleaning devices, etc. In some embodiments, the processors of the one or more robotic surface cleaning devices determines which robotic surface cleaning robotic device of the one or more robotic surface cleaning devices should respond to the surface cleaning request using a Markov Decision Process (MDP), wherein the action or actions that provide the greatest overall reward for the one or more robotic surface cleaning devices are chosen. Examples describing the implementation of a MDP for collaborating robotic devices are provided in U.S. patent application Ser. Nos. 15/981,643, 16/185,000, 16/230,805, 14/817,952, and 16/198,393 the entire contents of which are hereby incorporated by reference.

In some embodiments, a control system manages the one or more robotic surface cleaning devices. An example of a control system for managing robotic devices is described in U.S. patent application Ser. No. 16/130,880, the entire contents of which is hereby incorporated by reference. In some embodiments, the one or more robotic surface cleaning devices are paired with the control system using a pairing method such as that described in U.S. patent application Ser. No. 16/109,617, the entire contents of which is hereby incorporated by reference. In some embodiments, the control system includes, a centralized server, a specialized computing device, an application (mobile or web for example) accessible from a communication device such as a mobile phone, tablet, laptop, etc., or another type of device. In some embodiments, the control system is autonomous, semi-autonomous, or manually operated. In some embodiments, the processors of the one or more robotic surface cleaning devices communicate information with the control system, such as, usage data. In some embodiments, the control system receives a request for surface cleaning at a particular location. In some embodiments, the control system transmits instructions to a processor of a robotic surface cleaning device to navigate to a current location and clean the surfaces at the location. In some embodiments, the control system determines the robotic surface cleaning device based on locations of robotic surface cleaning devices (e.g., to determine nearest robotic device), fill volumes of debris containers of robotic surface cleaning devices, battery charge of robotic surface cleaning devices, etc. In some embodiments, the control system transmits information to the processors of the one or more robotic surface cleaning devices such as, the closest location to recharge a battery, the closest debris collection location, the closest parking area, and a navigational route.

In some embodiments, the one or more users request surface cleaning service by the one or more robotic surface cleaning devices using a graphical user interface of an application of a communication device paired with the one or more robotic surface cleaning devices or the control system managing the one or more robotic surface cleaning devices. An example of a communication device includes, a mobile phone, a laptop, a tablet, a desktop computer, a remote control, and the like. An example of a graphical user interface is described in U.S. patent application Ser. Nos. 15/272,752 and 15/949,708, the entire contents of which are hereby incorporated by reference. In some embodiments, the application of the communication device is paired with the one or more robotic surface cleaning devices or a control system of one or more robotic surface cleaning devices using pairing methods such as those described in U.S. patent application Ser. No. 16/109,617, the entire contents of which is hereby incorporated by reference. Information communicated between the application of the communication device and the one or more robotic surface cleaning devices or the control system of one or more robotic surface cleaning devices can include, but is not limited to, fill level of a particular robotic debris container, battery level of a particular robotic surface cleaning device, request of a robotic surface cleaning device at a particular location, robotic surface cleaning device settings (e.g., type of cleaning, movement pattern, areas to clean or avoid, etc.), mapping information, navigational information, a parking area location, etc. In some embodiments, a user communicates with the control system in real time using the application of the communication device, and the control system provides instructions to the one or more robotic surface cleaning devices (as described above) based on the information communicated from the application. In some embodiments, the control system determines which robotic surface cleaning device to transmit instructions to depending on, for example, the location, availability, battery level, etc. of the one or more robotic surface cleaning devices and the instruction requested by the user.

In some embodiments, a robotic surface cleaning device is associated to a user account by the operator of the surface cleaning service or a user of the user account using an application of a communication device connected with the server. In some embodiments, the application of the communication device scans a barcode on the robotic surface cleaning device to associate it to the user account. In some embodiments, a unique robotic surface cleaning device identifier is input into the application of the communication device. In some embodiments, a robotic surface cleaning device is associated to a user account by a control system managing the one or more robotic surface cleaning devices upon instructing the robotic surface cleaning device to respond to a surface cleaning request of a user of the user account. In some embodiments, a robotic surface cleaning device is associated to a user account by a processor of the robotic surface cleaning device upon the one or more processors of the one or more robotic surface cleaning devices instructing the robotic surface cleaning device to respond to a surface cleaning request of a user of the user account.

In some embodiments, the one or more robotic surface cleaning devices autonomously park in a designated parking area when unused. An example of a method for autonomous parking of robotic devices is described in U.S. patent application Ser. No. 16/230,805, the entire contents of which is hereby incorporated by reference. In some embodiments, the one or more robotic surface cleaning devices are operated using the autonomous vehicle system and methods described in U.S. patent application Ser. No. 16/230,805, the entire contents of which are hereby incorporated by reference. In some embodiments, the one or more robotic surface cleaning devices or a control system managing the one or more robotic surface cleaning devices autonomously adjusts their operational settings or chooses their actions based on environmental characteristics observed using methods such as those described in U.S. patent application Ser. Nos. 16/239,410 and 16/163,530, the entire contents of which are hereby incorporated by reference. For example, each of the one or more robotic surface cleaning devices may include a memory storing instructions that when executed by the one or more processors effectuate operations including determining a first location of a respective robotic surface cleaning device in an environment; obtaining, with the one or more sensors, first data indicative of an environmental characteristic of the first location; adjusting a first operational parameter of a first actuator based on the sensed first data, wherein the adjusting is configured to cause the first operational parameter to be in a first adjusted state while the respective robotic surface cleaning device is at the first location; and forming or updating a debris map of the environment based on data output by a sensor of the one or more sensors configured to sense debris on a floor of the environment over a plurality of cleaning sessions. In some embodiments, the first actuator is a motor configured to drive rotation of a vacuum impeller, fan, or blower; embodiment the first operational parameter is motor speed or torque; the environmental characteristic is a type of flooring in an ontology of floor types that distinguishes between carpet flooring and other types of flooring; and adjusting comprises increasing the motor speed or torque in response to determining the respective robotic surface cleaning device is over carpet flooring relative to motor speed or torque applied when the respective robotic surface cleaning device is over other types of flooring. In some embodiments, the operations further include segmenting the floor of the environment into a plurality of cells and assigning one or more debris accumulation scores to each of at least some of the cells among the plurality of cells based on one or more of: the data output by the sensor over the plurality of cleaning sessions, time elapsed since a last cleaning session, and type of cleaning performed in the last cleaning session. The one or more debris accumulation scores may indicate one or more probabilities that respective cells have accumulated more than one or more threshold amount of debris. In some embodiments, the operations further include assigning a debris classification to each of at least some of the cells among the plurality of cells based on one or more of: the data output by the sensor over the plurality of cleaning sessions, the time elapsed since the last cleaning session, and the type of cleaning performed in the last cleaning session. In some embodiments, the operations further include determining a route of the one or more robotic surface cleaning devices based on respective debris accumulation scores of the plurality of cells. Other environmental characteristics and adjustable operational settings are described in the above-referenced applications.

In embodiments, all or a portion of information transmitted by the processors of the one or more robotic surface cleaning devices or a control system managing the one or more robotic surface cleaning devices is stored in a centralized memory that can be accessed by the processors of the one or more robotic surface cleaning devices or the control system managing the one or more robotic surface cleaning devices. In some embodiments, information transmitted from the application of the communication device is stored in a centralized memory that can be accessed by the processors of the one or more robotic surface cleaning devices or the control system managing the one or more robotic surface cleaning devices. In some embodiments, the information transmitted and received between the control system, the one or more robotic surface cleaning devices, and the application of the communication device include several different types of information, such as scheduling information, mapping information, navigation information, task information, status information, internal or external observations, and other types of information that are useful to the control system, the one or more robotic surface cleaning devices, or a user of the application of the communication device.

In some embodiments, each of the one or more robotic surface cleaning devices include, but are not limited to, a chassis, a set of wheels, a suspension system, a rechargeable battery, an actuator, a control module, a processor, and a cleaning tool. An example of a robotic surface cleaning device is described in U.S. patent application Ser. Nos. 14/817,952, 16/198,393, 16/239,410, 16/041,286, 15/406,890, and 14/673,633 the entire contents of which is hereby incorporated by reference. In some embodiments, the chassis is a versatile mobile robotic chassis customized to function as a robotic surface cleaning device. An example of a customizable versatile mobile robotic chassis is described in U.S. patent application Ser. No. 16/230,805, the entire contents of which is hereby incorporated by reference. Examples of wheels of a robotic device are described in U.S. Patent Application No. 62/664,389, 15/447,450, 15/447,623, and 62/665,942, the entire contents of which are hereby incorporated by reference. Examples of a suspension system are described in U.S. Patent Application Nos. 62/617,589, 62/620,352, and Ser. No. 15/951,096, the entire contents of which are hereby incorporated by reference. In some embodiments, each of the one or more robotic surface cleaning devices further include a user interface for, for example, adjusting settings, choosing functions, and scheduling tasks.

In some embodiments, each of the one or more robotic surface cleaning devices further include a mapping module for mapping the environment using mapping methods such as those described in U.S. patent application Ser. Nos. 16/048,179, 16/048,185, 16/163,541, 16/163,562, 16/163,508, 16/185,000, 62/681,965, and 62/614,449, the entire contents of which are hereby incorporated by reference. For example, each of the one or more robotic surface cleaning devices may further comprise a memory storing instructions that when executed by their respective one or more processors effectuates operations. In some embodiments, the operations generate a spatial model of an environment of a respective one or more robotic surface cleaning devices. In some embodiments, the operations include capturing data by the one or more sensors moving within the environment, the data indicative of depth from respective one or more sensors to objects in the environment at a plurality of sensor poses; obtaining, with the one or more processors, a plurality of depth images based on the captured data; aligning, with the one or more processors, depth data of respective depth images based on overlap between fields of view of the plurality of depth images; determining, with the one or more processors, a spatial model of the environment based on the alignment of the depth data. A spatial model of the environment may also be generated by obtaining, with the one or more sensors, raw pixel intensity values of a first image and raw pixel intensity values of a second image, wherein the first image and the second image are taken from different sensor positions; determining, with the one or more processors, an overlapping area of a field of view of the first image and of a field of view of the second image by comparing the raw pixel intensity values of the first image to the raw pixel intensity values of the second image; spatially aligning, with the one or more processors, values based on sensor readings of the robot based on the overlapping area to construct the at least one floor plan; and inferring, with the one or more processors, features of the environment of the robot based on the spatially aligned sensor readings. In some embodiments, at least some data processing is offloaded to the cloud. In some embodiments, the spatial model is further processed to identify rooms. The above-referenced mapping methods include various methods for aligning depth data of depth images. For example, aligning a first depth image and a second depth image among the plurality of depth images may include detecting a feature in the first depth image; detecting the feature in the second depth image; determining a first value indicative of a difference in position of the feature in the first and second depth images in a first frame of reference of the one or more sensors; obtaining a second value indicative of a difference in pose of the one or more sensors between when the first depth image is obtained and the second depth image is obtained; and determining a first overlap between the first depth image and the second depth image based on the first value and the second value.

In some embodiments, each of the one or more robotic surface cleaning devices further include a localization module that implement localization methods such as those described in U.S. Patent Application Nos. 62/746,688, 62/740,573, 62/740,580, Ser. Nos. 15/955,480, 15/425,130, and 15/955,344 the entire contents of which are hereby incorporated by reference. In some embodiments, each of the one or more robotic surface cleaning devices further include a path planning module to determine optimal movement paths based on the actions to be executed using path planning methods such as those described in U.S. patent application Ser. Nos. 16/041,286, 15/406,890, and 14/673,633, the entire contents of which are hereby incorporated by reference. For example, each of the one or more robotic surface cleaning devices may further comprise a memory storing instructions that when executed by their respective one or more processors effectuates operations that determine a coverage path. The operations may include obtaining a map of a physical layout of an environment of a respective robotic surface cleaning device, the map including boundaries and obstacle perimeters detected using a plurality of the one or more sensors; maneuvering, during a cleaning or cleaning and mapping session, the respective robotic surface cleaning device to a first location and orientation of the environment that positions the respective robotic surface cleaning device to sense a part of the physical layout of the environment at a second location of the environment; sensing, with at least some of the one or more sensors, while the respective robotic surface cleaning device is at the first location, the part of the physical layout of the environment at the second location; updating, during the session, based on the sensing, the map of the physical layout of the environment; determining, during the session, based on the updated map, with one or more processors, at least a part of a coverage path of the respective robotic surface cleaning device through the environment, and maneuvering the respective robotic surface cleaning device along at least a part of the coverage path. In some embodiments, the environment is represented by a plurality of regions in a region graph. In some embodiments, an instance of a coverage pattern is determined for a first region among the plurality of regions based on a plurality of dimensions of the first region and determining the coverage pattern comprises determining a first region-specific orientation based on the plurality of dimensions of the first region.

In some embodiments, each of the one or more robotic surface cleaning devices further include a scheduling module for setting a schedule using scheduling methods such as those described in U.S. patent application Ser. Nos. 16/051, 328 and 15/449,660, the entire contents of which are hereby incorporated by reference. For example, an application of a communication device may be configured to generate at least one scheduling command; and transmit the at least one scheduling command to a router, wherein the router is configured to transmit the at least one scheduling command to a cloud service. In some embodiments, the one or more processors of a respective robotic surface cleaning device receives the at least one scheduling command from the cloud service; generates or modifies scheduling information of the respective surface cleaning robotic device based on the at least one scheduling command; and suggests a schedule of the respective surface cleaning robotic device based on previously received operational instructions and times of executing the instructions by the respective surface cleaning robotic device. In some embodiments, the scheduling information and/or the at least one scheduling command may include at least a time of operation, at least one area of operation, an order in which areas are to be operated on, a frequency of operation, a type of operation corresponding to each area to be operated on, and a duration of operation.

In some embodiments, each of the one or more robotic surface cleaning devices further include sensors such as battery level sensors, weight sensors, debris volume sensors, cameras, LIDAR sensors, LADAR sensors, stereo imaging sensors, optical sensors, imaging sensors, distance sensors, acoustic sensors, motion sensors, obstacle sensors, cliff sensors, floor sensors, debris sensors, electrical current sensors, time-of-flight sensors, depth sensors, signal transmitters and receivers, signal strength sensors, gyroscopes, optical encoders, optical flow sensors, GPS sensors, and other types of sensors. In some embodiments, each of the one or more robotic surface cleaning devices further include a wireless module to wirelessly send and receive information, such as a Wi-Fi module or a Bluetooth module.

Figure 1:
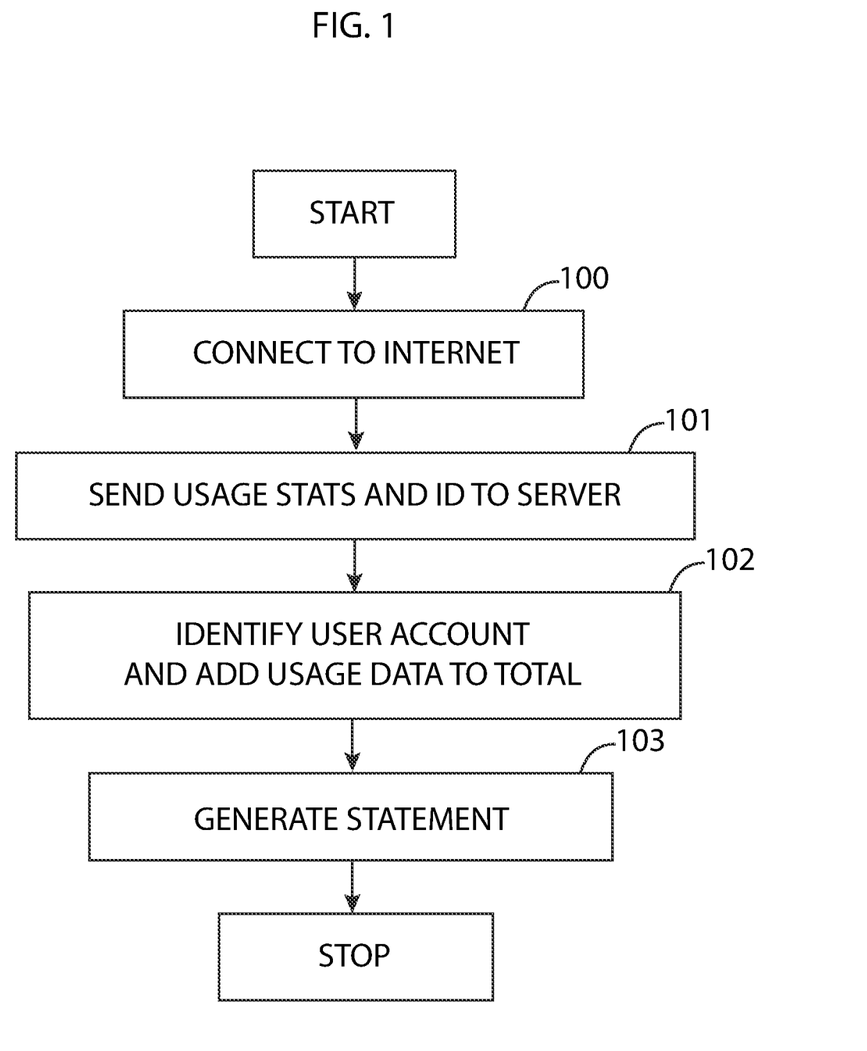
FIG. 1 illustrates an example of a process of a surface cleaning service system according to some embodiments.

FIG. 1 illustrates an example of a process of a surface cleaning service system. In a first step 100, a robotic surface cleaning device connects to the internet through a Network Interface Card (NIC), which is connected to a wireless router. In a next step 101, at predetermined intervals, usage data and a unique identifier of the robotic surface cleaning device are wirelessly transmitted by a processor of the robotic surface cleaning device to a server over a Wi-Fi network. As previously described, various usage data or other types of data can be transmitted by the processor of the robotic surface cleaning device without limitation. In a next step 102, the server identifies the user account currently associated with the particular robotic surface cleaning device from which the usage data was received and adds the usage data to a running total of the user account. In other embodiments, an operator of the surface cleaning service accesses the usage data using an application of a communication device connected to the server and identifies the user account currently associated with the particular robotic surface cleaning device from which the usage data was received and adds the usage data to the running total. In a next step 103, the server generates a cleaning service statement for the current user account based on the usage data associated with the user account. In other embodiments, the operator of the surface cleaning service accesses the user account using the application of the communication device and generates the cleaning service statement using the application of the communication device. The statement includes an amount due based on a predetermined rate multiplied by the unpaid usage measured (e.g., a run time while in the possession of the user). In the example shown, a daily total is used to generate the cleaning service statement. The length of the time period for which statements are generated can be shorter or longer, without limitation; the example given is for illustrative purposes only.

Figure 2:
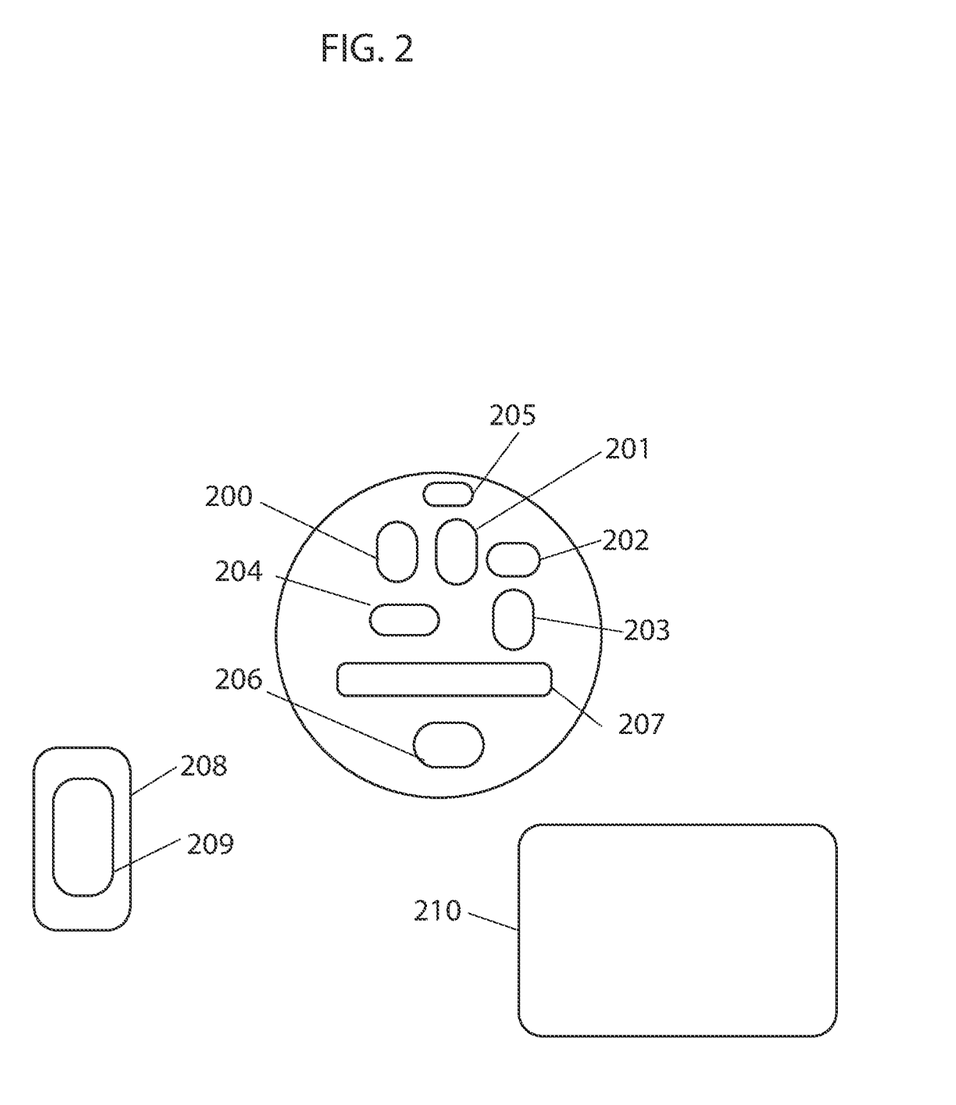
FIG. 2 illustrates an example of a robotic surface cleaning device, an application of a communication device, and a control system according to some embodiments.

FIG. 2 illustrates an example of a robotic surface cleaning device with a processor 200, a memory 201, an actuator 202, a motor 203, a NIC 204, a sensor 205, a usage monitoring mechanism 206 and a cleaning tool 207 to connect to the internet. Usage monitoring mechanism 206 monitors and records one or more usage parameters. In some embodiments, the usage monitoring mechanism 206 includes a clock or other synchronizing device that records the run time of the robotic surface cleaning device. In some embodiments, the usage monitoring mechanism 206 includes a sensor that monitors the weight of a debris container of the robotic device or a sensor that monitors the volume of a debris container of the robotic device. In some embodiments, the usage monitoring mechanism 206 includes a sensor that monitors when a debris container of the device is removed and/or emptied. In some embodiments, a combination of various means for monitoring and recording usage are used together to measure usage of the robotic device.

Some embodiments additionally include communication device 208 (e.g., mobile device, laptop, remote control, specialized computer, desktop computer, tablet, etc.) having a touchscreen 209 and that executes an application by which a user or operator interfaces with the robotic surface cleaning device or a control system 210 managing the robotic surface cleaning device. In some embodiments, processor 200 and memory 201 implement some of the functionality described herein. In some embodiments, the user or operator may provide instructions to robotic surface cleaning device to perform certain tasks or to use certain settings at certain times or in certain areas of an environment using the application of communication device 208 wirelessly paired with robotic surface cleaning device or control system 210 managing the robotic surface cleaning device.

Various embodiments are described herein below, including methods and techniques. It should be kept in mind that the invention might also cover articles of manufacture that include a computer-readable medium on which computer-readable instructions for carrying out embodiments of the inventive technique are stored. The computer-readable medium may include semiconductor, magnetic, opto-magnetic, optical, or other forms of computer-readable medium for storing computer-readable code. Further, the invention may also cover apparatuses for practicing embodiments of the invention. Such apparatus may include circuits, dedicated and/or programmable, to carry out tasks pertaining to embodiments of the invention. Examples of such apparatus include a computer and/or a dedicated computing device when appropriately programmed and may include a combination of a computer/computing device and dedicated/programmable circuits adapted for the various tasks pertaining to embodiments of the invention.

In block diagrams, illustrated components are depicted as discrete functional blocks, but embodiments are not limited to systems in which the functionality described herein is organized as illustrated. The functionality provided by each of the components may be provided by specialized software or specially designed hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing specialized code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The present techniques will be better understood with reference to the following enumerated embodiments:

1. A surface cleaning service system comprising: one or more robotic surface cleaning devices, each comprising: a chassis; a set of wheels; one or more motors to drive the wheels; one or more processors; one or more sensors; a usage monitoring mechanism; and a network interface card; and a server, wherein the one or more processors of each of the one or more robotic surface cleaning devices is configured to transmit usage data recorded by their respective usage monitoring mechanism to the server, and wherein the server is configured to associate each usage data with a particular robotic surface cleaning device of the one or more robotic surface cleaning devices from which the usage data was received.
2. The surface cleaning service system of embodiment 1, wherein the server is further configured to associate each usage data received with a user account.
3. The surface cleaning service system of embodiment 2, wherein the server is further configured to generate a cleaning service statement for the user account based on the usage data associated with the user account.
4. The surface cleaning service system of embodiments 1-3, wherein an operator of the surface cleaning service can access all the usage data, user accounts, and cleaning service statements using an application of a communication device paired with the server.
5. The surface cleaning service system of embodiments 1-4, wherein a user of the surface cleaning service can access the usage data and the cleaning service statements associated with their user account using the application of the communication device paired with the server.
6. The surface cleaning service system of embodiment 4, wherein each usage data received is associated with a user account using the application of the communication device paired with the server.
7. The surface cleaning service system of embodiment 4, wherein the cleaning service statements of the user accounts are generated using the application of the communication device paired with the server based on the usage data associated with each user account.
8. The surface cleaning service system of embodiments 1-7, wherein the usage monitoring mechanism comprises one or more of: a sensor for measuring run time of the one or more robotic surface cleaning devices to which the sensor is coupled, a sensor for measuring a debris container weight of the one or more robotic surface cleaning devices to which the sensor is coupled, and a sensor for measuring a debris volume within a debris container of the one or more robotic surface cleaning devices to which the sensor is coupled.
9. The surface cleaning service system of embodiments 1-8, wherein the usage data comprises one or more of: a total run time of the one or more robotic surface cleaning devices while in the possession of a particular user, a total increase in debris volume within a debris container of the one or more robotic surface cleaning devices while in the possession of the particular user, and a total increase in debris container weight of the one or more robotic surface cleaning devices while in the possession of the particular user.
10. The surface cleaning service system of embodiments 1-9, wherein the server is further configured to receive a request for surface cleaning service at a particular location.
11. The surface cleaning service system of embodiment 10, wherein the request for surface cleaning service at the particular location is transmitted to the server using the application of the communication device paired with the server.
12. The surface cleaning service system of embodiments 1-11, wherein the server is further configured to transmit and receive information to and from the one or more processors of the one or more robotic surface cleaning devices.
13. The surface cleaning service system of embodiment 12, wherein the information comprises one or more of: an instruction, a location, a navigation route to the location, a type of cleaning, robotic surface cleaning device settings, usage data, sensors data, environmental data, a cleaning movement path, mapping information, localization information, scheduling information, a status, a task progress, upcoming tasks, completed tasks, incomplete tasks, warning messages, a battery level, a debris container volume, a debris container weight, a run time, number of times a debris container is emptied, a robotic surface cleaning device condition, a parking area location, a charging station location, a debris collection location, a service location, robotic surface cleaning device wheel speed, robotic surface cleaning device impeller speed, robotic surface cleaning device brush speed, traffic data, a floor type, and obstacle data.
14. The surface cleaning service system of embodiments 1-14, wherein the one or more processors of the one or more robotic surface cleaning devices are further configured to receive the request for surface cleaning service at the particular location.
15. The surface cleaning service system of embodiment 14, wherein the request for surface cleaning service at the particular location is transmitted to the one or more processors of the one or more robotic surface cleaning devices using an application of a communication device paired with the one or more robotic surface cleaning devices.
16. The surface cleaning service system of embodiments 1-15, wherein the one or more processors of the one or more robotic surface cleaning devices are further configured to share information and autonomously choose actions.
17. The surface cleaning service system of embodiment 16, wherein the information comprises one or more of: an instruction, a location, a navigation route to the location, a type of cleaning, robotic surface cleaning device settings, usage data, sensors data, environmental data, a cleaning movement path, mapping information, localization information, scheduling information, a status, a task progress, upcoming tasks, completed tasks, incomplete tasks, warning messages, a battery level, a debris container volume, a debris container weight, a run time, number of times a debris container is emptied, a robotic surface cleaning device condition, a parking area location, a charging station location, a debris collection location, a service location, robotic surface cleaning device wheel speed, robotic surface cleaning device impeller speed, robotic surface cleaning device brush speed, traffic data, a floor type, and obstacle data.

18. The surface cleaning service system of embodiment 16, wherein the one or more processors autonomously choose actions using a Markov Decision Process.

19. The surface cleaning service system of embodiments 1-18, wherein settings of the one or more robotic surface cleaning devices are adjusted using the application of the communication device paired with the one or more robotic surface cleaning devices.

20. A surface cleaning service system comprising: one or more robotic surface cleaning devices, each comprising: a chassis; a set of wheels; one or more motors to drive the wheels; one or more processors; one or more sensors; a usage monitoring mechanism; and a network interface card; and a server, wherein the one or more processors of each of the one or more robotic surface cleaning devices is configured to transmit usage data recorded by their respective usage monitoring mechanism to the server, and wherein the server is configured to associate each usage data received with a particular robotic surface cleaning device of the one or more robotic surface cleaning devices and to a user account, and generate a cleaning service statement for the user account based on the usage data associated with the user account.

The invention claimed is:

1. A surface cleaning service system, comprising:
one or more robotic surface cleaning devices, each comprising:
    a chassis;
    a set of wheels;
    one or more motors to drive the wheels;
    one or more processors;
    one or more sensors;
    a network interface card; and
    a memory storing instructions that when executed by the one or more processors effectuates operations, comprising:
        determining, with the one or more processors, usage data of a respective robotic surface cleaning device;
        determining a first location of the respective robotic surface cleaning device in an environment;
        obtaining, with the one or more sensors, first data indicative of an environmental characteristic of the first location;
        adjusting a first operational parameter of a first actuator based on the sensed first data, wherein the adjusting is configured to cause the first operational parameter to be in a first adjusted state while the respective robotic surface cleaning device is at the first location; and
        forming or updating a debris map of the environment based on data output by a sensor of the one or more sensors configured to sense debris on a floor of the environment;
    wherein:
        the first actuator is a motor configured to drive rotation of a vacuum impeller, fan, or blower;
        the first operational parameter is motor speed or torque;
        the environmental characteristic is a type of flooring in an ontology of floor types that distinguishes between carpet flooring and other types of flooring; and
        adjusting comprises increasing the motor speed or torque in response to determining the robot is over carpet flooring relative to motor speed or torque applied when the respective robotic surface cleaning device is over other types of flooring.

2. The surface cleaning service system of claim 1, further comprising a control system configured to:
    associate each usage data with a particular robotic surface cleaning device from which the usage data was received;
    associate each usage data received with a user account; and
    generate a cleaning service statement for the user account based on the usage data associated with the user account.

3. The surface cleaning service system of claim 1, further comprising an application of a communication device configured to:
    provide an operator of the surface cleaning service system access to all the usage data, user accounts, and cleaning service statements of users; and
    a user of the surface cleaning service system access to usage data and cleaning service statements associated with their user account.

4. The surface cleaning service system of claim 1, wherein the one or more processors of each of the one or more robotic surface cleaning devices determines the usage data based on data collected by a sensor for measuring run time of the one or more robotic surface cleaning devices to which the sensor is coupled, a sensor for measuring a debris container weight of the one or more robotic surface cleaning devices to which the sensor is coupled, a sensor for measuring a debris volume within a debris container of the one or more robotic surface cleaning devices to which the sensor is coupled, or a sensor monitoring a number of times a debris container of the one or more robotic surface cleaning devices to which the sensor is coupled is removed and emptied.

5. The surface cleaning service system of claim 1, wherein the usage data comprises one or more of a total run time of the one or more robotic surface cleaning devices while in the possession of a particular user, a total increase in debris volume within a debris container of the one or more robotic surface cleaning devices while in the possession of the particular user, and a total increase in debris container weight of the one or more robotic surface cleaning devices while in the possession of the particular user.

6. The surface cleaning service system of claim 1, further comprising a control system configured to:
    receive a request for surface cleaning service at a particular location from an application of a communication device paired with the control system; and
    determine which robotic surface cleaning device is to respond to the request based on at least a location of each of the one or more robotic surface cleaning devices, a fill volume of a debris container of each of the one or more robotic surface cleaning devices, a battery charge of each of the or more robotic surface cleaning devices, and an availability of each of the one or more robotic surface cleaning devices.

7. The surface cleaning service system of claim 6, wherein:

the control system is further configured to transmit and receive information to and from the one or more processors of the one or more robotic surface cleaning devices; and the information comprises twenty of the following: an instruction, a location, a navigation route to the location, a type of cleaning, robotic surface cleaning device settings, the usage data, sensor data, environmental data, a cleaning movement path, mapping information, localization information, scheduling information, a status, a task progress, upcoming tasks, completed tasks, incomplete tasks, warning messages, a battery level, a debris container volume or a debris container weight, a run time, number of times a debris container is emptied, a floor type, obstacle data, collision information, a robotic surface cleaning device wheel speed, a robotic surface cleaning device impeller speed, a robotic surface cleaning device brush speed, traffic data, a robotic surface cleaning device condition, error notifications, and at least one of a parking area location, a charging station location, a debris collection location, and a service location.

8. The surface cleaning service system of claim 1, further comprising:

an application of a communication device paired with the one or more robotic surface cleaning devices and configured to:

display a fill level of a debris container of a particular robotic surface cleaning device, a battery level of a particular robotic surface cleaning device, a parking location of a particular robotic surface cleaning device, scheduling information, mapping information, navigation information, task information, status information, and internal or external observations; and receive at least one input designating a request for surface cleaning service at a particular location, mapping information, navigational information, and robotic surface cleaning device settings comprising a type of cleaning, a movement pattern, and areas to clean or avoid.

9. The surface cleaning service system of claim 1, wherein the operations further comprise:

transmitting and receiving, with the one or more processors of the respective robotic surface cleaning device, information to and from one or more processors of other robotic surface cleaning devices, respectively; and autonomously and collaboratively choosing actions with the one or more processors of each of the one or more robotic surface cleaning devices based on at least some of the information, wherein:

the one or more processors of each of the one or more robotic surface cleaning devices determine which robotic surface cleaning device is to respond to a request for surface cleaning service at a particular location based on at least a location of each of the one or more robotic surface cleaning devices, a fill volume of a debris container of each of the one or more robotic surface cleaning devices, a battery charge of each of the or more robotic surface cleaning devices, and an availability of each of the one or more robotic surface cleaning devices; and the information comprises at least one of an instruction, a location, a navigation route to the location, a type of cleaning, robotic surface cleaning device settings, the usage data, sensors data, environmental data, a cleaning movement path, mapping information, localization information, scheduling information, a status, a task progress, upcoming tasks, completed tasks, incomplete tasks, warning messages, a battery level, a debris container volume, a debris container weight, a run time, number of times a debris container is emptied, a robotic surface cleaning device condition, a floor type, obstacle data, robotic surface cleaning device wheel speed, robotic surface cleaning device impeller speed, robotic surface cleaning device brush speed, traffic data, and at least one of a parking area location, a charging station location, a debris collection location, and a service location.

10. The surface cleaning service system of claim 1, wherein the operations further comprise:

capturing data by the one or more sensors moving within an environment, the data indicative of depth from respective one or more sensors to objects in the environment at a plurality of sensor poses;

obtaining, with the one or more processors, a plurality of depth images based on the captured data;

aligning, with the one or more processors, depth data of respective depth images based on overlap between fields of view of the plurality of depth images; and determining, with the one or more processors, a spatial model of the environment based on the alignment of the depth data;

wherein:

at least some data processing is offloaded to the cloud; and the spatial model is further processed to identify rooms.

11. The method of claim 10, wherein aligning a first depth image and a second depth image among the plurality of depth images comprises:

detecting a feature in the first depth image;

detecting the feature in the second depth image;

determining a first value indicative of a difference in position of the feature in the first and second depth images in a first frame of reference of the one or more sensors;

obtaining a second value indicative of a difference in pose of the one or more sensors between when the first depth image is obtained and the second depth image is obtained; and determining a first overlap between the first depth image and the second depth image based on the first value and the second value.

12. The surface cleaning service system of claim 1, wherein the operations further comprise:

obtaining, with the one or more sensors, raw pixel intensity values of a first image and raw pixel intensity values of a second image, wherein the first image and the second image are taken from different sensor positions;

determining, with the one or more processors, an overlapping area of a field of view of the first image and of a field of view of the second image by comparing the raw pixel intensity values of the first image to the raw pixel intensity values of the second image;

spatially aligning, with the one or more processors, values based on sensor readings of the robot based on the overlapping area to construct the at least one floor plan; and inferring, with the one or more processors, features of the environment based on the spatially aligned sensor readings.

13. The surface cleaning service system of claim 1, wherein the operations further comprise:
- segmenting the floor of the environment into a plurality of cells; and
- assigning one or more debris accumulation scores to each of at least some of the cells among the plurality of cells based on one or more of: the data output by the sensor over a plurality of cleaning sessions, time elapsed since a last cleaning session, and type of cleaning performed in the last cleaning session;
- wherein the one or more debris accumulation scores indicate one or more probabilities that respective cells have accumulated more than one or more threshold amount of debris.

14. The surface cleaning service system of claim 13, wherein the operations further comprise:
- assigning a debris classification to each of at least some of the cells among the plurality of cells based on one or more of: the data output by the sensor over the plurality of cleaning sessions, the time elapsed since the last cleaning session, and the type of cleaning performed in the last cleaning session.

15. The surface cleaning service system of claim 14, wherein the operations further comprise:
- determining a route of the respective robotic surface cleaning device based on respective debris accumulation scores of the plurality of cells.

16. The surface cleaning service system of claim 14, wherein the operations further comprise:
- obtaining a map of a physical layout of an environment of the respective robotic surface cleaning device, the map including boundaries and obstacle perimeters detected using a plurality of the one or more sensors;
- maneuvering, during a cleaning or cleaning and mapping session, the respective robotic surface cleaning device to a first location and orientation of the environment that positions the respective robotic surface cleaning device to sense a part of the physical layout of the environment at a second location of the environment;
- sensing, with at least some of the one or more sensors, while the respective robotic surface cleaning device is at the first location, the part of the physical layout of the environment at the second location;
- updating, during the session, based on the sensing, the map of the physical layout of the environment;
- determining, during the session, based on the updated map, with one or more processors, at least a part of a coverage path of the respective robotic surface cleaning device through the environment, wherein:
  - the environment is represented by a plurality of regions in a region graph;
  - an instance of a coverage pattern is determined for a first region among the plurality of regions based on a plurality of dimensions of the first region; and
  - determining the coverage pattern comprises determining a first region-specific orientation based on the plurality of dimensions of the first region; and
- maneuvering the respective robotic surface cleaning device along at least a part of the coverage path.

17. The surface cleaning service system of claim 1, further comprising an application of a communication device configured to:
- generate at least one scheduling command; and
- transmit the at least one scheduling command to a router, wherein the router is configured to transmit the at least one scheduling command to a cloud service; and
- the operations further comprise:
  - receiving, with the one or more processors, the at least one scheduling command from the cloud service;
  - generating or modifying, with the one or more processors, scheduling information of the respective robotic surface cleaning device based on the at least one scheduling command; and
  - suggesting, with the one or more processors, a schedule of the respective robotic surface cleaning device based on previously received operational instructions and times of executing the instructions by the respective robotic surface cleaning device.

18. The surface cleaning system of claim 17, wherein the at least one scheduling command comprises at least a time of operation, at least one area of operation, an order in which areas are to be operated on, a frequency of operation, a type of operation corresponding to each area to be operated on, and a duration of operation.

* * * * *